Patented July 14, 1936

2,047,196

UNITED STATES PATENT OFFICE 2,047,196

REFINING OF CRUDE FATS AND FATTY OILS

Eric William Fawcett, Northwich, England, assignor to Imperial Chemical Industries Limited, a corporation of Great Britain No Drawing. Application May 9, 1935, Serial No. 20,691. In Great Britain May 11, 1934

9 Claims. (Cl. 87—12)

This invention relates to the refining of crude fats and fatty oils, for example linseed oil, cotton seed oil, ground nut oil, palm oil, whale oil and the like, and more particularly to the removal therefrom of the undesired impurities such as free fatty acids, colouring matter and resinous or vegetable matter.

In the ordinary method of refining crude vegetable oils and fats, it is customary to remove the "break" by a treatment with alkalis, acids or salts. This removes certain mucilages, proteids and non-oily constituents or impurities of the crude oil. For the present purposes an oil so treated may be called a "broken" oil. In further treatments it is usual to submit the broken fat or oil to a bleaching operation, employing for example, absorbents such as fuller's earth or active charcoal, and finally to deodorize the oil by distillation in steam, with or without the employment of a vacuum. For high grade products, alkali breaking is almost universally employed, and in making neutral oils, which are ordinarily what is wanted, it is customary to employ an excess of alkali, i. e. sufficient to neutralize the free fatty acids contained in the fat or oil as well as to remove the mucilage, the mixture of soaps, impurities, and excess of aqueous alkali settling out as foots. The foots are removed and the oil dried by heating. Other methods of breaking are little used for high-grade edible fats or oils or drying oils; further, when acid refining is used, it is usually regarded as essential to follow it with an alkali treatment, to remove the acid employed for breaking and some or all of the fatty acids of the fat or oil.

The term "mucilage" means mucilaginous or gummy matter including any other solid or semi-solid colloidal matter which separates from the crude fat or fatty oil as a result of the treatments described, but excluding the free fatty acids which come out as soaps. That is, the non-saponifiable and non-fatty impurities in the oil or fat are the mucilage.

Hitherto it has not been possible to remove the undesired impurities from crude fats and fatty oils by distillation methods, owing to the decomposition of the desired refined fats and oils at the temperatures required for the distillation even when the distillation is carried out by means of the usual vacuum distillation technique. I have found that the employment of so-called "molecular distillation" (by which is understood distillation under extremely low pressures and with the distilling and condensing surfaces a distance apart of the same order as the mean free path of the molecules of the substance being distilled under the particular pressure employed) enables some separation by distillation to be effected, but does not give altogether satisfactory results, inasmuch as a substantial proportion of the crude fat or oil appears in the first runnings or remains in the residue, both of which have undesirable properties, while the main fraction also leaves something to be desired in the way of quality.

I have now found that high grade products may be obtained in excellent yield by first "breaking" the fat or oil by any suitable known process, and then submitting the broken fat or oil to short-path distillation under high vacuum. By "high vacuum" is to be understood a vacuum of the order of $10^{-2}$ to $10^{-5}$ mms. of mercury, and by "short path distillation" under conditions such that the oil distills without ebullition from a heated surface and is condensed on a condensing surface in a very close proximity to the heating surface, namely, some 1–5 cms. distant. When the distance between the condensing and heating surfaces is less than the mean free path of the molecules of the substance being distilled, the distillation is sometimes called "molecular distillation" and under such conditions the rate of distillation is greater than when the said distance exceeds the mean free path. For a complete description of methods and apparatus for high vacuum or molecular distillation, reference is made to U. S. Patent No. 1,955,321 to Burch et al., issued April 17, 1934, entitled Vacuum distillation. The apparatus therein described can be utilized in carrying out the processes of the present invention. U. S. Patent No. 1,950,830, issued March 13, 1934 to van Dijck, discloses another type of molecular still which can be used in carrying out my processes.

In general, impurities such as free fatty acids, colouring matter, etc. distill off first at a considerably lower temperature than the triglycerides, and if necessary the latter may be distilled off at a higher temperature from other impurities such as resinous or vegetable matter.

My process enables me to dispense with some of the operations used in existing refining technique, and to effect purification by distillation without decomposition of the triglycerides. Further, I may use a relatively cheap breaking process, as, with acid breaking, I do not require to employ the customary alkali wash, and with alkali breaking, I need only use the very small quantity of the alkali sufficient to achieve removal of the mucilage etc., i. e. I may if desired dispense with the customary excess designed also to neutralize the free fatty acids. The breaking step is necessary prior to distillation, partly because it avoids mechanical troubles which might be caused by the presence of mucilage etc., in the short path still, but more so because it appears to assist the distillation in some way, at present not fully understood, as evidenced by the superior yield and quality of the final product. This is a remarkable effect in view of the very small quantities of breaking substances which need be used; proportions of the order of one part reagent to 1000 parts oil. Such small proportions are far insufficient to effect any appreciable neutralization of free fatty acids or saponification of the neutral oil.

Example 1

A raw Egyptian cottonseed oil was broken by treatment with 0.1 per cent by weight of 50 per cent NaOH solution for one hour at 80° C., with stirring. After cooling, the oil stood for 6 hours to allow the mucilage to settle. (This period could be shortened by centrifuging or filtration.)

The clear oil separated from the mucilage by filtration or decantation was distilled in a short path still, under a vacuum of $10^{-3}$ to $10^{-4}$ mms. of mercury and with a separation of 1.5 cms. between the heating and condensing surfaces. The first runnings, distilled off at about 200–220 C., comprised rather less than 5 per cent of the total oil distilled; this fraction was dark-coloured, and contained also the free fatty acids of the original oil. The remainder of the oil was distilled at 250–260° C., at which temperature the oil completely distilled except for about 5 per cent of a dark tarry residue. Some 90 per cent of the oil was obtained in this main fraction, which was a water-white oil, almost tasteless and odourless, and having an acid value of 0.1–0.2.

Naturally, instead of obtaining one main distillate in this way, the distillation could be carried out to give a number of fractions if fractions of special properties, e. g. with reference to viscosity, melting point, drying properties, etc. were required.

By distilling the raw oil without first breaking it, a much larger discoloured first fraction is obtained, as much as 15–20 per cent, while the main fraction in addition to being a correspondingly smaller proportion of the total oil distilled, is markedly inferior in colour, taste, and smell to that obtained from the broken oil. Further, separation of mucilage in the still may give rise to operating difficulties such as splashing.

Example 2

A raw Egyptian cottonseed oil was broken by treatment with 0.1 per cent by weight of 98 per cent sulphuric acid for one hour at 70° C. with stirring. Mucilage was removed as described in the previous example, and the broken oil was fed to a high vacuum short path still.

The first fraction, about 7 per cent, was distilled off at about 210° C. The main fraction, removed at 250–260° C. and comprising around 90 per cent of the total oil fed to the still, had properties similar to those of the corresponding fraction described in the previous example.

Example 3

A raw Indian linseed oil (iodine number about 180) was broken with 0.1 per cent by weight of alkali, mucilage removed, and the oil distilled as in Example 1 or 2. After removing the colouring materials and free fatty acids in the first fraction (200–220° C.), the principal distillate (240–260° C.) was a very pale yellow oil having excellent drying properties.

Example 4

A crude whale oil was broken with 0.1 per cent by weight of caustic soda solution, the mucilage, etc., removed, and the oil distilled in a short-path high vacuum still. After removing colouring matter and fatty acids in a first fraction, amounting to rather less than 10 per cent of the oil, at 200–210° C., the principal distillate (225–260° C.) was an almost colourless oil free from the unpleasant smell and taste of the original oil, and amounted to about 85 per cent of the initial oil.

I claim:—

1. Process for refining crude fats and fatty oils to secure in high yield a refined fat or oil which comprises subjecting the fat or oil to a breaking treatment with a small amount of alkaline agent, separating impurities and submitting the thus treated material to distillation under a high vacuum corresponding to a pressure lower than about 0.01 millimeter of mercury and under short path conditions and at such temperature as to cause distillation of a relatively small fraction containing concentrated therein fatty acid impurities.

2. Process for refining crude fats and fatty oils to secure a refined fat or oil in high yield, which comprises subjecting a fat or oil to a small amount of mineral acid, separating impurities, and submitting the thus treated fat or oil to distillation under a high vacuum corresponding to a pressure lower than about 0.01 millimeter of mercury under short path conditions and at such temperature as to cause distillation of a relatively small fraction containing concentrated therein the free fatty acids of the fat or oil.

3. Process according to claim 2 wherein the fat or oil, after treatment with acid, is treated with alkali.

4. The process of claim 5 in which the raw material is a vegetable fatty oil.

5. Process for refining fats and fatty oils from which break has been removed, to secure in high yield a purified fat or oil, which comprises subjecting the fat or oil to distillation under a high vacuum corresponding to a pressure lower than about 0.01 mm. of mercury under short path conditions and under such temperature as to cause distillation of a small fraction containing fatty acid impurities concentrated therein, leaving a large residue of purified fat or oil.

6. Process for refining crude fats and fatty oils to secure in high yield a purified fat or oil which comprises submitting a crude fat or oil to a breaking treatment with a reagent for removal of impurities, removing impurities and subjecting the fat or oil to distillation under a high vacuum corresponding to a pressure lower than about 0.01 mm. of mercury and under short path conditions at a low temperature to distill off a small proportion containing fatty acid impurities concentrated therein, and then subjecting the remaining fat or oil to distillation under similar conditions but at a higher temperature sufficient to cause the tri-glycerides to distill off and recovering such tri-glycerides, leaving a small residue.

7. Process for refining crude fats and fatty oils to secure a refined fat or oil in high yield which comprises subjecting the fat or oil to a breaking treatment with a modicum of alkaline agent sufficient to modify mucilage in the starting material and cause separation thereof but insufficient to neutralize the free fatty acids in the starting material, separating mucilage impurities and submitting the thus treated material to distillation under a high vacuum corresponding to a pressure lower than about 0.01 mm. of mercury and under short path conditions and at such temperature as to cause distillation of a relatively small fraction containing concentrated therein the free fatty acids of the fat or oil.

8. In the manufacture of neutral oils from oils containing free fatty acids and non-fatty impurities the process which comprises treating the oil with a minimal amount of caustic alkali solution in the amount necessary to cause a separation of non-fatty impurities, removing the separation and exposing the residual oil to short path distillation under conditions distilling over free fatty acids.

9. Process set forth in claim 6, in which the reagent used for the breaking treatment is an alkaline reagent.

ERIC WILLIAM FAWCETT.